United States Patent
Norris et al.

(10) Patent No.: US 10,210,733 B1
(45) Date of Patent: Feb. 19, 2019

(54) EXTENDED BATTERY LIFE SMOKE DETECTOR

(71) Applicant: Kidde Technologies, Inc., Wilson, NC (US)

(72) Inventors: Robert J. Norris, Wilson, NC (US); Terry Simpson, Wake Forest, NC (US)

(73) Assignee: Kidde Technologies, Inc., Wilson, NC (US)

( * ) Notice: Subject to any disclaimer, the term of this patent is extended or adjusted under 35 U.S.C. 154(b) by 0 days.

(21) Appl. No.: 15/949,658

(22) Filed: Apr. 10, 2018

(51) Int. Cl.
  *G08B 17/10* (2006.01)
  *H02J 7/00* (2006.01)
  *H05B 33/08* (2006.01)

(52) U.S. Cl.
  CPC ............ *G08B 17/10* (2013.01); *H02J 7/0065* (2013.01); *H05B 33/0845* (2013.01); *H02J 2007/0067* (2013.01)

(58) Field of Classification Search
  USPC ........................................................ 340/628
  See application file for complete search history.

(56) References Cited

U.S. PATENT DOCUMENTS

| | | | | |
|---|---|---|---|---|
| 5,444,434 A | * | 8/1995 | Serby | G08B 29/181 320/114 |
| 5,699,262 A | * | 12/1997 | Lang | G07F 7/069 194/906 |
| 6,246,320 B1 | * | 6/2001 | Monroe | B64D 45/0015 340/506 |
| 6,253,064 B1 | * | 6/2001 | Monroe | G08G 5/0082 455/430 |
| 6,392,692 B1 | * | 5/2002 | Monroe | B64D 45/0015 340/506 |
| 6,545,601 B1 | * | 4/2003 | Monroe | B64D 45/0015 340/3.1 |
| 7,557,705 B2 | | 7/2009 | Oas | |
| 8,004,397 B2 | | 8/2011 | Forrest et al. | |
| 8,033,686 B2 | | 10/2011 | Recker et al. | |
| 8,319,640 B2 | | 11/2012 | McGinnis et al. | |
| 9,485,425 B1 | | 11/2016 | Swift | |
| 9,683,729 B2 | | 6/2017 | Rothschild | |
| 9,764,201 B2 | | 9/2017 | Binder | |
| 9,786,153 B2 | | 10/2017 | London | |
| 2004/0119587 A1 | * | 6/2004 | Davenport | B61L 5/189 340/538 |
| 2004/0196155 A1 | * | 10/2004 | Wilker | G08B 7/062 340/691.1 |
| 2006/0125794 A1 | * | 6/2006 | Afriat | G06F 1/32 345/166 |
| 2007/0205908 A1 | * | 9/2007 | Du | G08B 5/36 340/636.1 |
| 2010/0080548 A1 | * | 4/2010 | Peterson | G03B 17/55 396/153 |

(Continued)

*Primary Examiner* — Kerri L McNally
*Assistant Examiner* — Thang D Tran
(74) *Attorney, Agent, or Firm* — Kinney & Lange, P.A.

(57) ABSTRACT

A smoke detector of an aircraft cargo container includes a status light emitting diode (LED), at least one accelerometer, and one or more processors. The at least one accelerometer is configured to sense movement of the aircraft cargo container and provide a sensor signal representative of the sensed movement. The one or more processors is configured to receive the sensor signal and adjust a blinking rate of the status LED based upon the sensor signal.

18 Claims, 4 Drawing Sheets

(56) References Cited

U.S. PATENT DOCUMENTS

| | | | |
|---|---|---|---|
| 2012/0249013 A1* | 10/2012 | Valois | H05B 37/0227 |
| | | | 315/291 |
| 2014/0132409 A1* | 5/2014 | Billman | G08B 19/00 |
| | | | 340/539.1 |
| 2014/0191875 A1* | 7/2014 | Wedig | G08B 7/066 |
| | | | 340/628 |
| 2014/0316581 A1* | 10/2014 | Fadell | G05D 23/1904 |
| | | | 700/276 |
| 2015/0277388 A1* | 10/2015 | Almudafier | G04G 15/00 |
| | | | 368/11 |
| 2016/0134794 A1* | 5/2016 | Grabau | G06K 9/00771 |
| | | | 348/155 |
| 2017/0113813 A1* | 4/2017 | Heuer | B64D 45/0005 |
| 2018/0170518 A1* | 6/2018 | Niemiec | B64C 3/56 |

* cited by examiner

EXTENDED BATTERY LIFE SMOKE DETECTOR

BACKGROUND

In certain aircraft applications aircraft electrical power is not readily available, and sensing functions have to rely on internal battery power. One example of this is a stand-alone smoke detector situated in an aircraft cargo container. Lithium and other battery technologies have particularly good specific power density, enabling them to provide power for months to years. However, it is desirable to extend the battery life further.

SUMMARY

In one example, a smoke detector of an aircraft cargo container comprises a status light emitting diode (LED), at least one accelerometer, and one or more processors. The at least one accelerometer is configured to sense movement of the aircraft cargo container and provide a sensor signal representative of the sensed movement. The one or more processors is configured to receive the sensor signal and adjust a blinking rate of the status LED based upon the sensor signal.

In one example, a method comprises sensing movement of an aircraft cargo container using at least one accelerometer of a smoke detector; providing a sensor signal representative of the sensed movement using the at least one accelerometer of the smoke detector; receiving the sensor signal using one or more processors of the smoke detector; and adjusting a blinking rate of a status LED of the smoke detector based upon the sensor signal using the one or more processors.

DETAILED DESCRIPTION

Apparatus, systems, and associated methods relate to extending battery life of an aircraft smoke detector. In some applications, such as smoke detection of aircraft cargo carriers, smoke detectors are not always subject to visual inspection. In these cases, status lights provide no benefit and cause unnecessary drain on smoke detector batteries. Using the apparatus, systems, and associated methods herein allows for status lights of smoke detectors to be turned on for less time when the smoke detectors are not subject to visual inspection. The smoke detectors include accelerometer(s) to allow the smoke detector to sense movement and vibration. Based upon the sensed movement and vibration, the smoke detector can determine it is not subject to visual inspection, such as when an aircraft cargo carrier is being transported by ground or flight. In this way, the status light is used less when it is not subject to visual inspection, thereby extending battery life and requiring less frequent maintenance.

Figure 1:
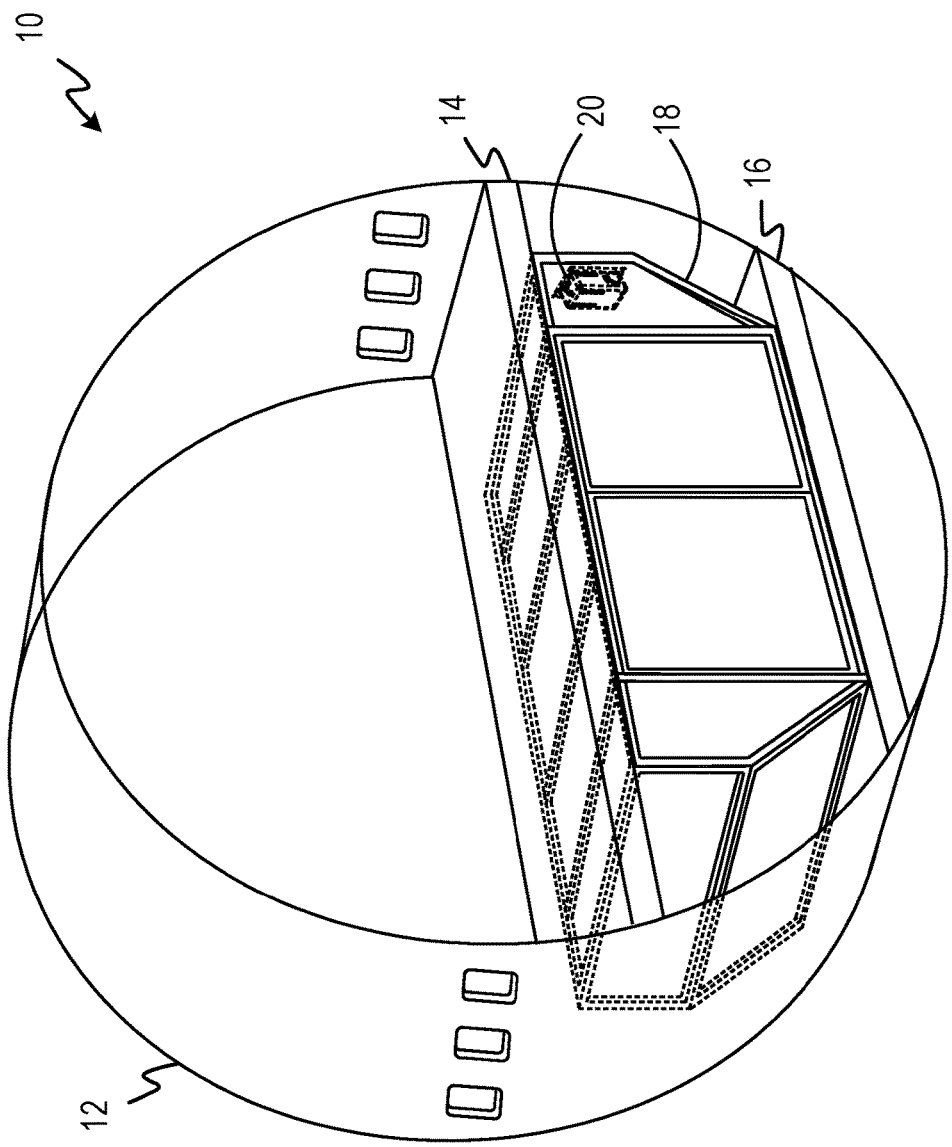
FIG. 1 is a cross-sectional view of an aircraft fuselage.

FIG. 1 is a cross-sectional view of aircraft fuselage 10 including fuselage frame 12, cabin floor 14, cargo floor 16, aircraft cargo container 18, and smoke detector 20.

Aircraft cargo container 18 is designed to store cargo in a shape that fits the cargo area of aircraft between cabin floor 14, cargo floor 16, and fuselage frame 12. This shape prevents aircraft cargo container 18 and cargo it may contain from shifting within aircraft, causing weight shifts that affect aircraft flight. Smoke detector 20 is mechanically coupled to the inside of aircraft cargo container 18 to detect smoke from potential fires within aircraft cargo container 18.

Figure 2:
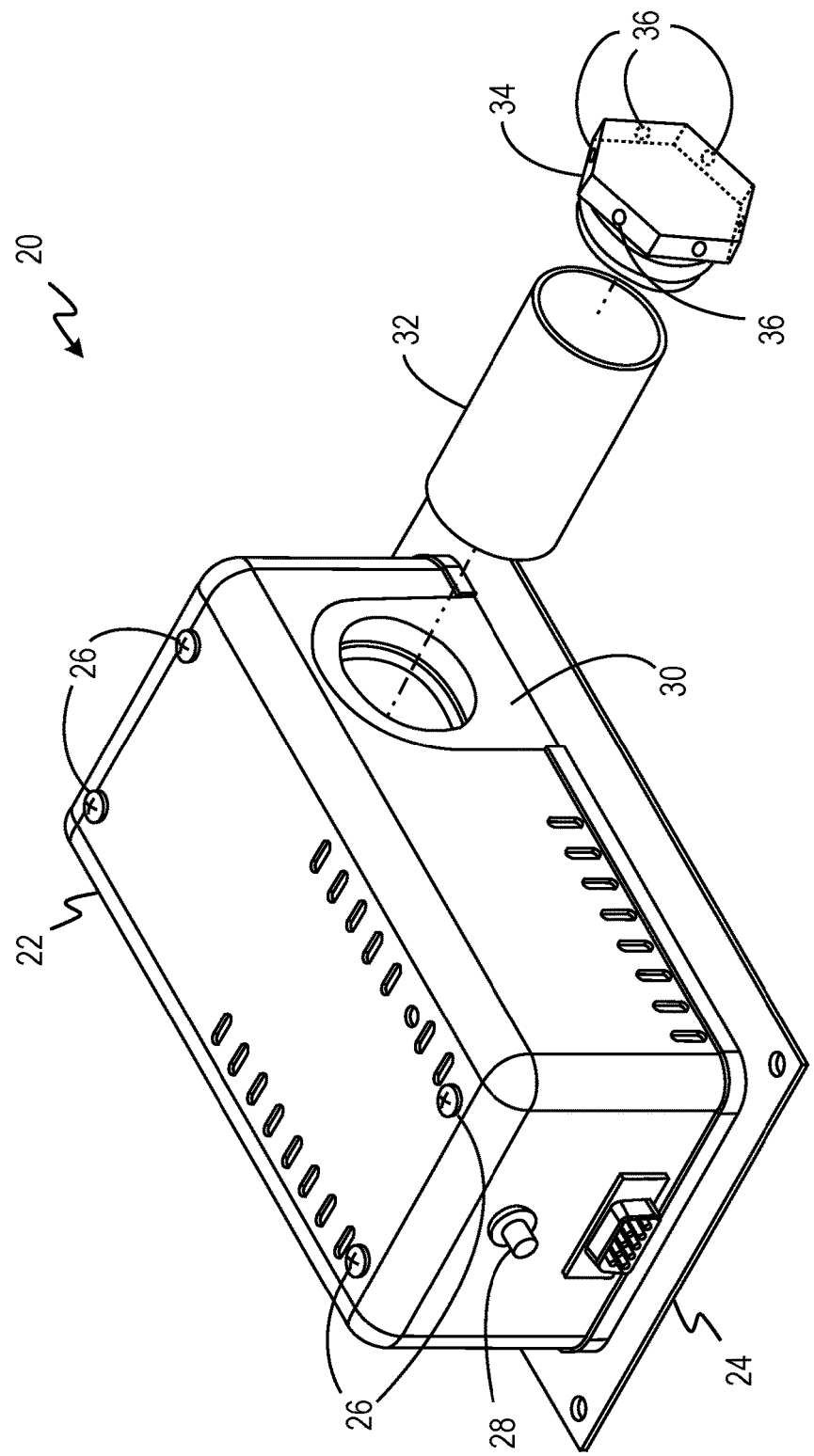
FIG. 2 is a partially exploded perspective view of a smoke detector.

FIG. 2 is a partially exploded perspective view of a smoke detector 20 including smoke detector case 22, baseplate 24, fasteners 26, press-to-test button 28, battery housing 30, battery 32, end cap 34, and discharge holes 36.

Smoke detector case 22 is mechanically coupled to baseplate 24 by fasteners 26. Baseplate 24 can be mechanically coupled to the interior of an aircraft cargo container such as aircraft cargo container 18 of FIG. 1. Smoke detector case 22 protects internal circuitry from being damaged by external sources such as cargo of an aircraft cargo container. Push-to-test button 28 allows a user to test the operability of the smoke detector by pressing push-to-test button 28. Battery housing 30 is made of lightweight non-flammable material. In one example, battery housing 30 and end cap 34 are made of steel. End cap 34 seals battery 32 in battery housing 30. End cap 34 threads into the opening of battery housing 30. Battery housing 30 provides protection for battery 32 from sources of mechanical damage. Battery housing 30 also provides protection to smoke detector 20 and cargo from battery 32 in case of thermal runaway. In one example, battery housing 30 is at least partially formed of conductive material to provide positive and negative electrical connections to battery 32. In one example, battery housing 30 is mechanically coupled to baseplate 24. In a further example, battery housing 30 is monolithically formed with baseplate 24.

Battery 32 is a lithium battery. Lithium batteries provide the benefit of a higher specific power density than sodium-ion, silver-zinc, nickel-cadmium, or other battery types. When lithium batteries are compromised by mechanical damage, internal shorting, and/or external shorting, thermal runaway can occur. Thermal runaway is an exothermic chemical reaction with a positive feedback loop. The exothermic reaction releases heat, which acts as a catalyst speeding up the chemical reaction, which in turn releases more heat, causing an exponential temperature increase. Thermal runaway can result in electrolyte breakdown, fire, and/or explosions. To prevent electrolyte breakdown, fire, and/or explosions, battery housing 30 is made of non-flammable material and end cap 34 includes discharge holes 36.

Battery housing 30 and end cap 34 form a battery container. Discharge holes 36 vent electrolyte of battery 32 during thermal runaway. Discharge holes allow expanding electrolyte to escape from battery housing 30 without causing an explosion. In one example, discharge holes 36 are formed on flat perimeter surfaces of end cap 34. Discharge holes 36 are arranged in diametrically opposed pairs so that the force experienced by end cap 34 from electrolyte escaping from holes 36 is effectively zero. This prevents end cap 34 from accelerating and becoming a dangerous projectile. With only a single discharge hole, or an arrangement of holes that provide a force on end cap 34, end cap 34 could accelerate and may break the battery container. In one example, end cap 34 can have n discharge holes spaced 360/n degrees apart. Arranged in this manner, discharge holes 36 will effectively exert zero force on end cap 34. In another example, discharge holes 36 are composed of one or more diametrically opposed pairs of discharge holes. In one example, discharge holes 36 are discharge valves that allow fluid flow in one direction.

Figure 3:
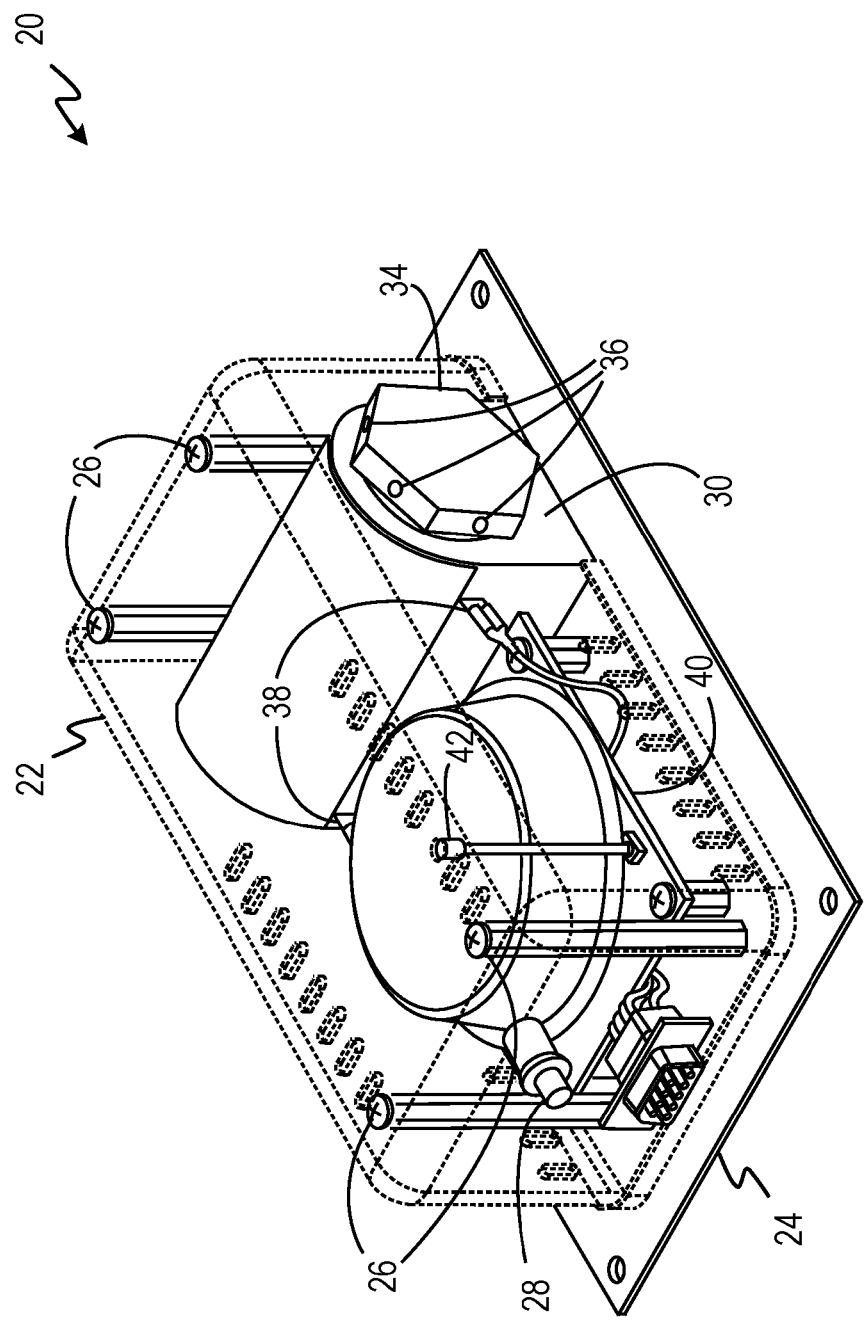
FIG. 3 is a partially transparent second perspective view of the smoke detector.

FIG. 3 is a perspective view of a smoke detector 20 including smoke detector case 22, baseplate 24, fasteners 26, press-to-test button 28, battery housing 30, end cap 34, discharge holes 36, battery leads 38, circuit board 40, and status light emitting diode (LED) 42. As shown in FIG. 3 smoke detector case 22 is illustrated transparently to show battery leads 38, circuit board 40, and status light emitting diode (LED) 42.

Battery leads 38 provide power from battery 32 to circuit board 40. Circuit board 40 contains the components necessary for smoke detector 20 to function as a smoke detector. Status LED 42 is electrically coupled to circuit board 40. Status LED 42 receives power from circuit board 40.

Figure 4:
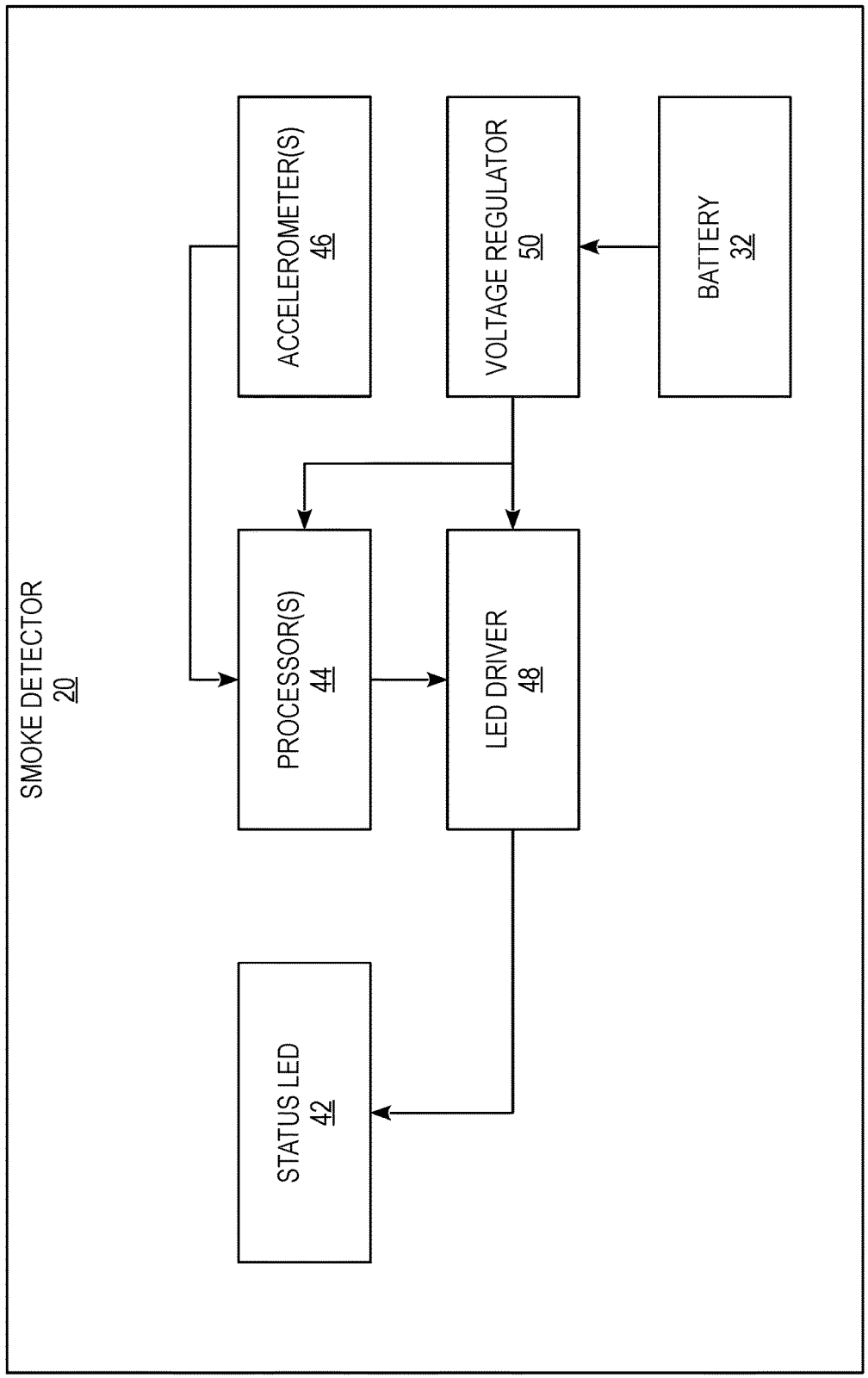
FIG. 4 is a block diagram of the smoke detector.

FIG. 4 is a block diagram of smoke detector 20 including battery 32, status LED 42, processor(s) 44, accelerometer(s) 46, LED driver 48, and voltage regulator 50. For purposes of clarity and ease of discussion, FIG. 4 is discussed with respect to smoke detector 20 of FIGS. 2 and 3.

Battery 32 is electrically coupled to voltage regulator 50 via battery leads 38 and circuit board 40. Voltage regulator 50 regulates the voltage of the power provided by battery 32 to appropriate voltages for processor(s) 44 and LED driver 48. Processor(s) 44 can be a microprocessor, microcontroller, or other processors. Accelerometer(s) 46 sense movement and/or vibration of smoke detector 20. Accelerometer(s) 46 sense movement and/or vibration when on a moving aircraft or a moving aircraft cargo container. Accelerometer(s) 46 provides a sensor signal to processor(s) 44 representative of the sensed movement and/or vibration. Processor(s) 44 sets a blinking rate of status LED 42 based upon the sensor signal. Processor(s) 44 determines if the sensed movement exceeds a threshold based upon the sensor signal. Processor(s) 44 sets the blinking rate of status LED 42 to a first blinking rate if the sensed movement/vibration is equal to or less than the threshold. Processor(s) 44 sets the blinking rate of status LED 42 to a second blinking rate if the movement/vibration exceeds the threshold. The first blinking rate is faster than the second blinking rate. Press-to-test button 28 is configured to set the blinking rate of status LED 42 to the first blinking rate even when the sensed movement exceeds a threshold. In one example, press-to-test button 28 is configured to set the blinking rate of status LED 42 to a third blinking rate. The third blinking rate can be faster than the first blinking rate. Processor(s) 44 provides control signals to LED driver 48. LED driver 48 provides power to status LED 42 based upon the blinking rate. In one example the first blinking rate is once every five seconds and the second blinking rate is once every twenty seconds.

Many design/certification authorities require a continuously blinking light to provide a positive indication of smoke detector function. However, during ground transportation or flight, smoke detector 20 is out of sight and is not subject to visual status inspections because the aircraft cargo container containing smoke detector 20 is closed. At these times, battery 32 provides power to status LED 42 even though status LED 42 cannot be seen. At these times, a slower rate of blinking drains less power which extends battery life of battery 32. In one example, battery life of battery 32 is extended by 20%.

Accordingly, implementing techniques of this disclosure, aircraft smoke detectors can extend battery life by sensing movement/vibration using accelerometers. Using aircraft smoke detectors as described herein, provides the ability to extend battery life of smoke detectors by decreasing the blinking rate of the smoke detector status LED when the smoke detector is not subject to visual inspection. This decreases the frequency of smoke detector maintenance and battery replacement.

Discussion of Possible Embodiments

The following are non-exclusive descriptions of possible embodiments of the present invention.

A smoke detector of an movable vessel can comprise a status light emitting diode (LED); at least one accelerometer configured to sense movement of the movable vessel; and provide a sensor signal representative of the sensed movement; and one or more processors configured to receive the sensor signal; and adjust a blinking rate of the status LED based upon the sensor signal.

The smoke detector of the preceding paragraph can optionally include, additionally and/or alternatively, any one or more of the following features, configurations and/or additional components:

The processor can be further configured to determine whether the sensed movement exceeds a threshold based upon the sensor signal; set the blinking rate of the status LED to a first blinking rate if the sensed movement is equal to or less than the threshold; and set the blinking rate of the status LED to a second blinking rate if the sensed movement exceeds the threshold.

The first blinking rate can be at least twice as fast as the second blinking rate.

The first blinking rate can be at least four times faster than the second blinking rate.

A battery; at least one LED driver; a voltage regulator configured to receive power from the battery; provide a first power output at a first voltage to the one or more processors; and provide a second power output at a second voltage to the at least one LED driver; and wherein the at least one LED driver is configured to provide power to the status LED based upon the first or second blinking rate.

A baseplate mechanically coupled to the movable vessel.

The threshold can be based upon movement experienced by the aircraft cargo carrier during ground transportation.

The threshold can be further based upon movement experienced by the aircraft cargo carrier during flight.

A press-to-test button that can be configured, in response to being pressed, to set the blinking rate of the status LED to the first blinking rate even when the sensed movement exceeds the threshold.

The press-to-test button can be configured to set the blinking rate of the status LED to the first blinking rate for at least 10 seconds in response to being pressed.

A method can comprise sensing movement of an movable vessel using at least one accelerometer of a smoke detector; providing a sensor signal representative of the sensed movement using the at least one accelerometer of the smoke detector; receiving the sensor signal using one or more processors of the smoke detector; and adjusting a blinking rate of a status LED of the smoke detector based upon the sensor signal using the one or more processors.

The method of the preceding paragraph can optionally include, additionally and/or alternatively, any one or more of the following features, configurations and/or additional components:

Determining, using the one or more processors, whether the sensed movement exceeds a threshold based upon the sensor signal; setting, using the one or more processors, the blinking rate of the status LED to a first blinking rate if the sensed movement is equal to or less than the threshold; and setting, using the one or more processors, the blinking rate of the status LED to a second blinking rate if the sensed movement exceeds the threshold.

The first blinking rate can be at least twice as fast as the second blinking rate.

The first blinking rate can be at least four times faster than the second blinking rate.

Receiving power from a battery using a voltage regulator; providing, using the voltage regulator; a first power output at a first voltage to the one or more processors; providing, using the voltage regulator, a second power output at a second voltage to the at least one LED driver; and providing, using the at least one LED driver, power to the status LED based upon the first or second blinking rate.

Sensing, using the at least one accelerometer, vibration of the movable vessel via a baseplate of the smoke detector mechanically coupled to the movable vessel.

The threshold can be based upon movement experienced by the aircraft cargo carrier during ground transportation.

The threshold can be further based upon movement experienced by the aircraft cargo carrier during flight.

Setting, using the at least one processor, the blinking rate of the status LED to the first blinking rate in response to a press-to-test button of the smoke detector being pressed.

Setting, using the at least one processor, the blinking rate of the status LED to the first blinking rate for at least 10 seconds in response to a press-to-test button of the smoke detector being pressed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A smoke detector of a movable vessel comprising:
    a status light emitting diode (LED);
    at least one accelerometer configured to:
        sense movement of the movable vessel; and
        provide a sensor signal representative of the sensed movement; and
    one or more processors configured to:
        receive the sensor signal;
        determine whether the sense movement exceeds a threshold based upon the sensor signal; and
        adjust a blinking rate of the status LED based upon the sensor signal such that the blinking rate of the status LED is set to a first blinking rate if the sensed movement is equal to or less than the threshold and the blinking rate of the status LED is set to a second blinking rate if the sensed movement exceeds the threshold.

2. The smoke detector of claim 1, wherein the first blinking rate is at least twice as fast as the second blinking rate.

3. The smoke detector of claim 1, wherein the first blinking rate is at least four times faster than the second blinking rate.

4. The smoke detector of claim 1, further comprising:
    a battery;
    at least one LED driver;
    a voltage regulator configured to:
        receive power from the battery;
        provide a first power output at a first voltage to the one or more processors; and
        provide a second power output at a second voltage to the at least one LED driver; and
    wherein the at least one LED driver is configured to provide power to the status LED based upon the first or second blinking rate.

5. The smoke detector of claim 1, further comprising a baseplate mechanically coupled to the movable vessel.

6. The smoke detector of claim 5, wherein the threshold is based upon movement experienced by the movable vessel during ground transportation.

7. The smoke detector of claim 6, wherein the threshold is further based upon movement experienced by the movable vessel during flight.

8. The smoke detector of claim 1, further comprising a press-to-test button configured, in response to being pressed, to set the blinking rate of the status LED to the first blinking rate even when the sensed movement exceeds the threshold.

9. The smoke detector of claim 8, wherein the press-to-test button is configured to set the blinking rate of the status LED to the first blinking rate for at least 10 seconds in response to being pressed.

10. A method comprising:
    sensing movement of a movable vessel using at least one accelerometer of a smoke detector;
    providing a sensor signal representative of the sensed movement using the at least one accelerometer of the smoke detector;
    receiving the sensor signal using one or more processors of the smoke detector;
    determining, using the one or more processor, whether the sensed movement exceeds a threshold based upon the sensor signal; and
    adjusting a blinking rate of a status LED of the smoke detector based upon the sensor signal using the one or more processors by setting the blinking rate of the status LED to a first blinking rate if the sensed movement is equal to or less than the threshold and to a second blinking rate if the sensed movement exceeds the threshold.

11. The method of claim 10, wherein the first blinking rate is at least twice as fast as the second blinking rate.

12. The method of claim 10, wherein the first blinking rate is at least four times faster than the second blinking rate.

13. The method of claim 10, further comprising:
    receiving power from a battery using a voltage regulator;
    providing, using the voltage regulator; a first power output at a first voltage to the one or more processors;
    providing, using the voltage regulator, a second power output at a second voltage to the at least one LED driver; and
    providing, using the at least one LED driver, power to the status LED based upon the first or second blinking rate.

14. The method of claim 10, further comprising sensing, using the at least one accelerometer, vibration of the movable vessel via a baseplate of the smoke detector mechanically coupled to the movable vessel.

15. The method of claim 14, wherein the threshold is based upon movement experienced by the aircraft cargo carrier during ground transportation.

16. The method of claim 15, wherein the threshold is further based upon movement experienced by the aircraft cargo carrier during flight.

17. The method of claim 10, further comprising setting, using the at least one processor, the blinking rate of the status LED to the first blinking rate in response to a press-to-test button of the smoke detector being pressed.

18. The method of claim 17, further comprising setting, using the at least one processor, the blinking rate of the status LED to the first blinking rate for at least 10 seconds in response to a press-to-test button of the smoke detector being pressed.

* * * * *